United States Patent [19]

Belangee

[11] 4,227,391
[45] Oct. 14, 1980

[54] PROCESS FOR MAKING TUBE IN SHEET HEAT EXCHANGERS

[75] Inventor: Kenneth Belangee, Alton, Ill.

[73] Assignee: Olin Corporation, New Haven, Conn.

[21] Appl. No.: 7,556

[22] Filed: Jan. 29, 1979

[51] Int. Cl.³ ............................................. B23P 15/26
[52] U.S. Cl. .................................. 72/54; 29/157.3 V; 72/61
[58] Field of Search ..................... 72/54, 61, 379, 479, 72/60; 228/157, 118, 191; 29/157.3 V, 157.3 R, 421 R, 239; 113/118 R; 81/52, 35

[56] References Cited

U.S. PATENT DOCUMENTS

| | | | |
|---|---|---|---|
| 2,662,273 | 12/1953 | Long | 29/157.3 V |
| 2,690,002 | 9/1954 | Grenell | 29/157.3 V |
| 2,691,815 | 10/1954 | Boessenkool | 228/197 |
| 2,740,188 | 4/1956 | Simmons | 29/157.3 V |
| 2,753,623 | 7/1956 | Boessenkool | 228/205 |
| 2,835,025 | 5/1958 | Pauls | 29/157.3 V |
| 2,938,413 | 5/1960 | Pauls | 29/157.3 V |
| 3,004,327 | 10/1961 | Keith | 29/157.3 V |
| 3,037,277 | 6/1962 | Pauls | 29/157.3 V |
| 3,045,618 | 7/1962 | Adams | 29/157.3 V |
| 3,061,924 | 11/1962 | Brick | 228/118 |
| 3,271,846 | 9/1966 | Buechele | 29/157.3 V |
| 3,346,936 | 10/1967 | Miller | 228/157 |
| 3,377,683 | 4/1968 | Tranel | 29/157.3 V |
| 3,397,045 | 8/1968 | Winter | 428/612 |
| 3,408,723 | 11/1968 | Myers | 29/157.3 V |
| 3,435,504 | 4/1969 | Miller | 29/157.3 V |
| 3,465,568 | 9/1969 | Jonason | 29/157.3 V |
| 3,792,725 | 2/1974 | Burgeson | 145/29 R |
| 4,021,901 | 5/1977 | Kleine | 29/157.3 V |
| 4,066,121 | 1/1978 | Kleine | 165/170 |
| 4,093,024 | 6/1978 | Middleton | 29/157.3 V |

FOREIGN PATENT DOCUMENTS 212814 1/1957 Australia .

Primary Examiner—Francis S. Husar
Assistant Examiner—Gene P. Crosby
Attorney, Agent, or Firm—Paul Weinstein

[57] ABSTRACT

An apparatus and process for forming an opening in a composite metal panel on an edge of the panel at a position wherein the opening is to be formed and hammered to delineate a bond interface. The opening is formed between the sheets of the panel and inwardly of the edge thereof starting from the delineated bond interface. The opening is adapted to provide a means for communicating a fluid under pressure for inflating tubular passageways in the panel.

4 Claims, 11 Drawing Figures

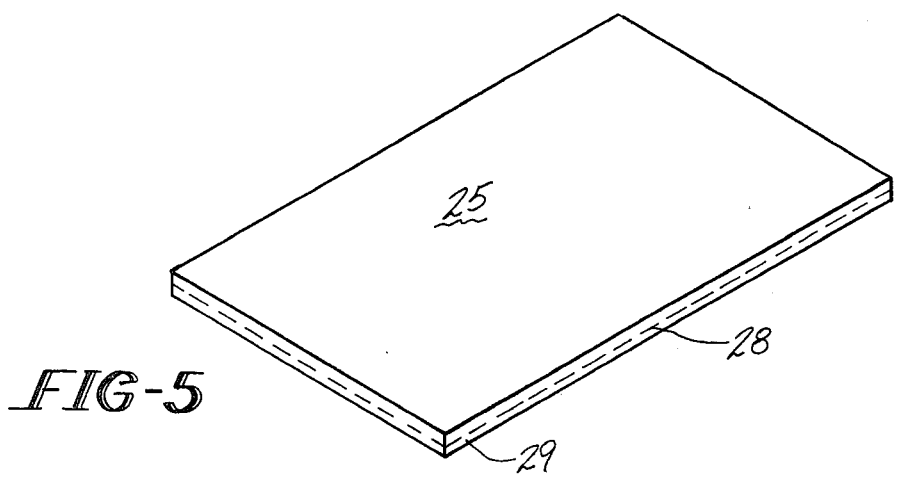
*FIG-5*
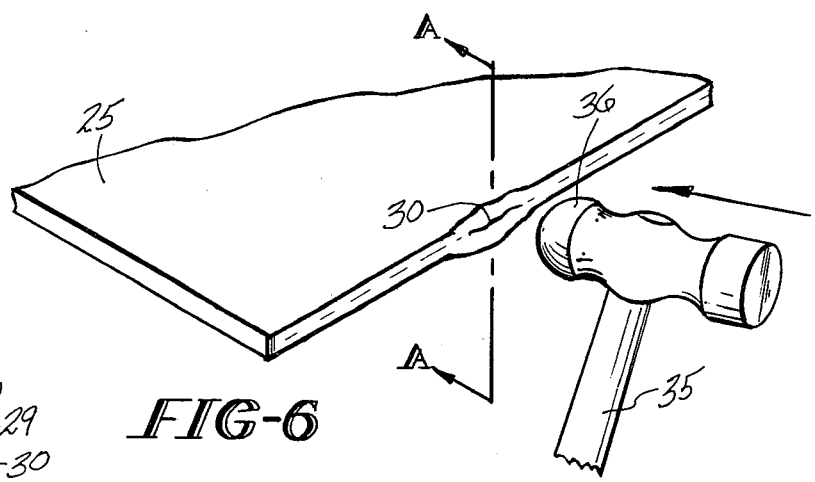
*FIG-6*
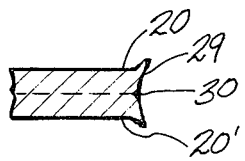
*FIG-7*
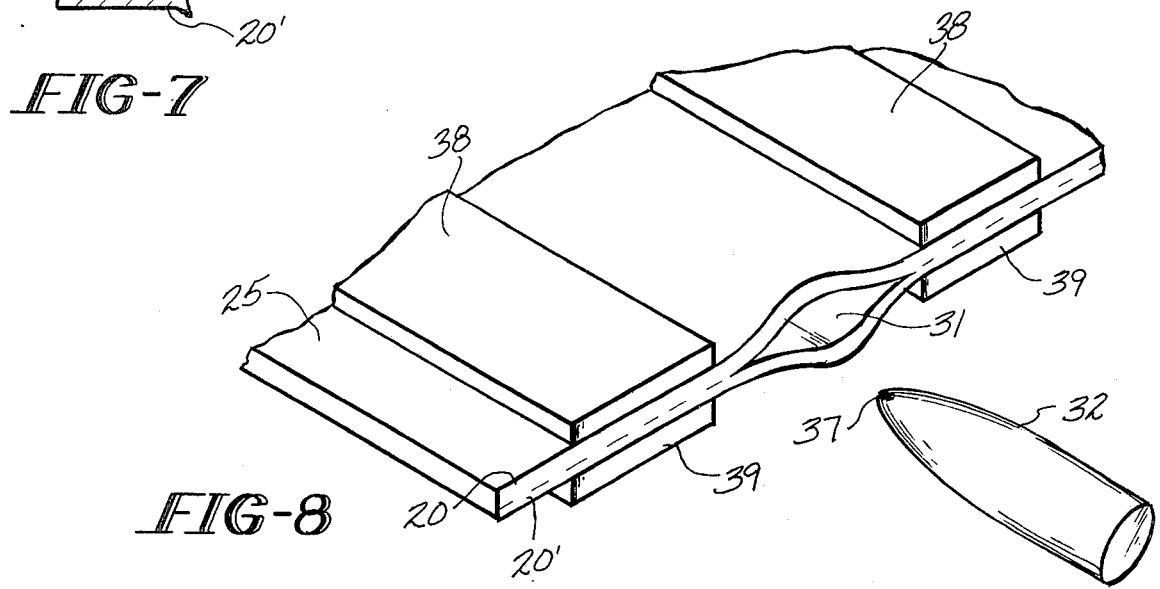
*FIG-8*
*FIG-9*

PROCESS FOR MAKING TUBE IN SHEET HEAT EXCHANGERS

BACKGROUND OF THE INVENTION

This invention relates to an improved processs and apparatus for making tube in sheet type heat exchange panels. These panels find particular application in solar energy collectors and related type devices.

PRIOR ART STATEMENT

Tube in sheet type heat exchange panels have been made commercially for many years by the ROLL-BOND ® process as exemplified in U.S. Pat. No. 2,690,002 to Grenell. These panels have found wide commercial application in refrigerator heat exchangers. More recently they have found application in the field of solar energy as absorber panels, etc., as exemplified in U.S. Pat. Nos. 4,021,901 and 4,066,121 to Kleine et al. and U.S. Pat. No. 4,093,024 to Middleton.

The ROLL-BOND ® process has proved to be highly effective for those applications, however, there are some difficulties associated with the process. One difficulty is the inability to precisely control the final shape and location of the pattern of stop weld material sandwiched between the composite metal sheets after they have been bonded together. The aforenoted difficulties result in the need for large tube free portions at the sides and ends of the panels, which can greatly reduce their efficiency and increase the cost of the panels.

While the ROLL-BOND ® process as set forth in the Grenell patent has found worldwide commercial application, other processes for obtaining tube in sheet type panels are also known. One of those processes comprises an approach wherein the composite metal sheets are "green" bonded together without a stop-weld pattern and the tubular pattern is formed by inflation in a die whose cavity defines the tubular pattern. Various examples of this process are set forth in U.S. Pat. Nos. 3,271,846 to Buechele et al., 3,346,936 to Miller et al., 3,435,504 to Miller and 3,465,568 to Jonason and in Australian Pat. No. 212,814 to Watson.

In the Australian patent to Watson there is disclosed a process for making heat exchangers wherein clean faced sheets of metal are roll forged to provide a bond that can be broken by internal pressure. The bonded sheets are placed in a matrix die having a cavity or cavities therein corresponding to the shape and configuration of the ducts required in the heat exchanger. Pressure is applied to inflate the respective ducts, etc., in conformity with the die cavity. The process as disclosed can be carried out without a bond enhancement heat treatment.

The Miller patent describes the use of the bonding process employing cold rolling as disclosed in U.S. Pat. Nos. 2,691,815 and 2,753,623 to Boessenkool et al. Another known bonding process wherein sheets are strongly bonded together by cold rolling is disclosed in U.S. Pat. No. 3,397,045 to Winter.

The tubular patterns in the tube in sheet type heat exchange panels described above are formed by inflation. In order to inflat the panel it is necessary to insert an inflation needle into an edge thereof. As described in U.S. Pat. Nos. 2,835,025, 2,938,413 and 3,037,277, all to Pauls, it has been known to shear the edge of the panel on a bias in order to delineate the stop-weld pattern at the bond line. The lower lip of the panel is then bent away from the upper lip to further delineate the bond line. A punch is then inserted between the sheets to form an opening into which the inflation needle can be inserted.

It is known as described in the U.S. Pat. No. 3,037,277 to utilize a vibratory type punch or chisel for opening up the passageway. In U.S. Pat. No. 3,045,618 to Adams a combined vibratory punch and inflation tool is described. U.S. Pat. Nos. 3,004,327 to Keith et al., 3,377,683 to Tranel and 3,408,723 to Myers are illustrative of other tool designs used for forming an opening from an edge of the panel.

The approaches described above for mechanically forming the opening work quite well when utilizing the ROLL-BOND ® process which employs a stop-weld material. The stop-weld is generally markedly different in color than the metal of the panel and, therefore, clearly delineates the bond line where the chisel for opening the tube is to be inserted. This delineation is further enhanced when the edge of the panel is sheared on a bias as described in the Pauls' patents.

When one utilizes the "green" bond process for forming the composite metal panels, it has been found that it is very difficult to identify the bond line between the respective sheets of the panel for insertion of the chisel or punch. This occurs because there is no stop-weld pattern to delineate the bond line as in the ROLL-BOND ® process. The bond line must be delineated in order to properly position the chisel at the edge of the panel for forming the inflation opening.

SUMMARY OF THE INVENTION

In accordance with this invention an improved process and apparatus is provided for making heat exchanger panels particularly adapted for use in solar applications. Clean face sheets of metal are bonded together by cold rolling to a desired reduction in thickness to form a composite having a "green" bond which can be broken at reasonable inflation pressures. An inflation or other type opening between the sheets is formed in the panel from an edge thereof. In order to delineate the bond line between the sheets of the panel at the position along the panel edge where the opening is to be formed in accordance with this inventon the edge is first hammered to cause the sheets making up the panel at the edge to be upset and separate to delineate the bond line. A chisel is then positioned at the separation and hammered or vibrated inwardly of the panel to form the inflation opening. The inflation is carried out while the composite is clamped within a die having a cavity or cavities defining a desired tubular configuration.

Peening is the preferred means for hammering the edge of the panel to delineate the bond line.

Accordingly, it is an object of this invention to provide an improved process and apparatus for making heat exchanger panels.

It is a further object of this invention to provide an improved process and apparatus as above wherein a "green" bonded composite metal panel is hammered at an edge thereof to delineate the bond line.

These and other objects will become more apparent from the following description and drawings.

BRIEF DESCRIPTION OF THE DRAWINGS

FIG. 5 is a perspective view of a composite metal panel in accordance with this invention;

FIG. 6 is a partial perspective view of a composite metal panel with the bond line delineated by hammering;

FIG. 7 is a partial side view in cross section of the panel of FIG. 6 along the line A—A;

FIG. 8 is a partial perspective view of the panel of FIG. 6 after forming the inflation opening;

FIG. 9 is a perspective view of a chisel punch for forming the inflation opening;

DETAILED DESCRIPTION OF PREFERRED EMBODIMENTS

Figure 1:
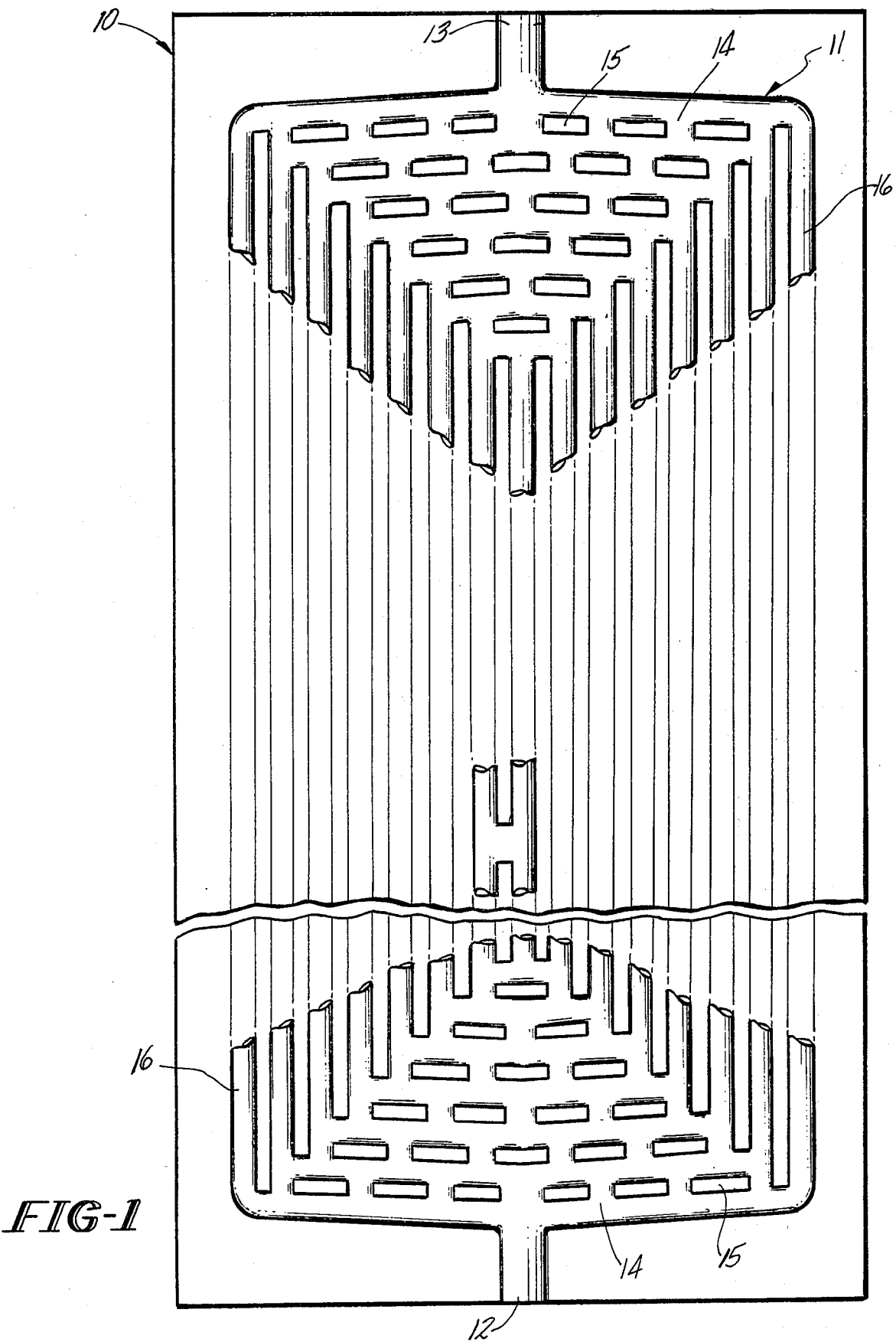
FIG. 1 is a schematic illustration of a heat exchanger panel in accordance with this invention.

Referring now to FIG. 1 there is shown by way of example a schematic illustration of a heat exchanger panel 10 useful in applications involving solar energy. For example, the panel 10 is useful an an absorber plate in a solar energy collector. The panel shown in FIG. 1 is representative of a plank type panel which is approximately about 12 inches wide and from 6 to 10 feet long. Absorber panels 10 having various sizes are known in the art. The panel 10 itself is of a tube in sheet configuration. The panel is formed from composite metal sheets which remain bonded together everywhere except where tubular passageways 11 or channels have been expanded within the composite. A variety of techniques have been utilized to form tube in sheet type heat exchanger panels as described in the background of the invention. The present invention is particularly directed to an apparatus and process for forming a tube in sheet heat exchanger as in FIG. 1 by first "green" bonding the composite sheets together followed by die inflation.

The specific design of the panel 10 shown in FIG. 1 includes entry 12 and exit ports 13 communicating with triangular shaped headers 14. The headers 14 include a plurality of bonded islands 15 for obstructing and directing the flow of the heat exchange fluid to provide uniform flow across the width of the panel 10. The triangular shaped headers 14 are connected together by a plurality of parallel tubular passageways 16.

Figure 2:
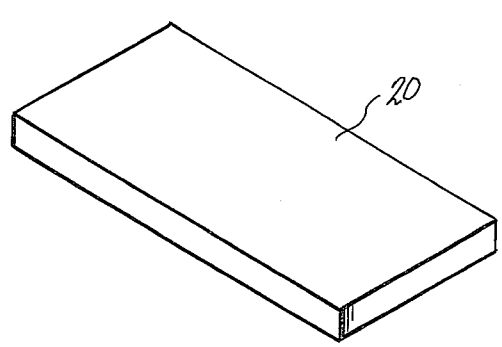
FIG. 2 is a perspective view of a metal sheet used to make a composite panel in accordance with this invention.
Figure 3:
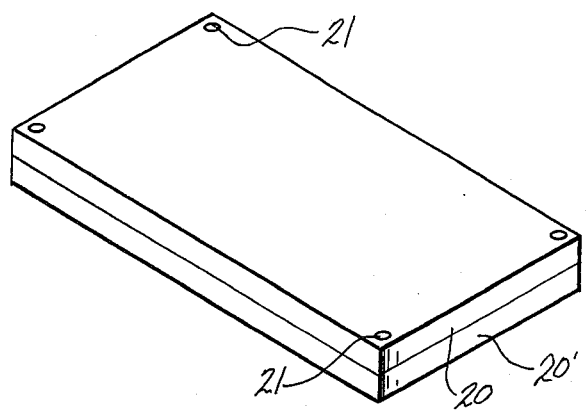
FIG. 3 is a perspective view of overlapped and staked sheets prior to bonding.

In accordance with this invention the composite metal panels may be formed from panel size strips of metal 20 such as shown in FIG. 2. Two such strips 20 and 20' having at least one face brushed or otherwise suitably cleaned are placed in overlapping relationship as in FIG. 3 with the cleaned faces in engagement. They are staked 21 together at the corners of the panels in accordance with conventional practice. The staked sheets are then fed as in FIG. 4 through the nip of a cold rolling mill 22 to provide the desired "green" bond. The rolling mill comprises rolls 23 and 24 which subject the overlapped sheets to a desired reduction in thickness to provide a so-called "green" bonded composite metal panel 25 having a moderate degree of bond strength. Immediately adjacent to the rolling mill and in close proximity downstream thereof there is preferably positioned a coolant application station 26 wherein coolant is applied to the as-bonded composite metal panel 25 from above in order to reduce its temperature to a temperature below which substantial bond enhancement will not occur. If desired, an auxiliary coolant application station 27 could be located below the panel 25 to apply the coolant to the bottom surface of the panel as well. Alternatively, the coolant application station 27 alone could be used in place of the station 26.

The cold rolling described above is normally carried out at relatively high speed. Further details of the process for making the bonded composite metal panels may be found by reference to U.S. application Ser. No. 937,118, filed Aug. 28, 1978 to Winter. As described in the above Winter application, the composite metal panels can be formed from coiled strip which is continuously bonded and then cut to desired panel lengths.

In U.S. application Ser. No. 937,336, filed Aug. 28, 1978 by Winter et al., a process and apparatus is disclosed for inflating tubular passageways in composite metal panels formed as just described. Winter et al. suggest that the inflation opening in the composite metal panel be formed by conventional techniques such as those described in the background of this application. While it is possible to utilize those techniques, difficulties have been encountered in practice in determining where the bond line lies at the panel edge between the sheets which make up the composite. It is necessary to identify the bond line in order to properly position the chisel for forming the inflation opening.

Referring to FIG. 5 a panel 25 formed by the above described process is shown. The bond line 28 is indicated by a dotted line. However, in practice for panels comprised of metal sheets of approximately the same color it is difficult to actually identify the bond line. This problem is overcome in accordance with the present invention by upsetting the edge 29 of the panel 25 at a position where the inflation opening is to be formed. This upsetting operation comprises hammering the edge 29 of the panel to deform it and cause the bond between the sheets 20 and 20' at the edge where the hammering is applied to break. This results in a crack-like separation 30 between the sheets 20 and 20' at the edge 29 which is effective to delineate the bond line 28. After the bond line 28 has been delineated it is possible to form the inflation opening 31 as in FIG. 8 through the use of a conventional chisel type tool 32 as in FIG. 9.

The hammering can be carried out by hand using a conventional hammer 35. Preferably, a ball-peen hammer is used as shown. Using the balled or curved surface 36 of the hammer 35 is preferred. While a ball type hammer face 36 is preferred any desired hammer shape could be utilized which will provide the desired upset of the panel edge 29 and cracking apart of the sheets of the panel to delineate the bond line 28.

Figure 4:
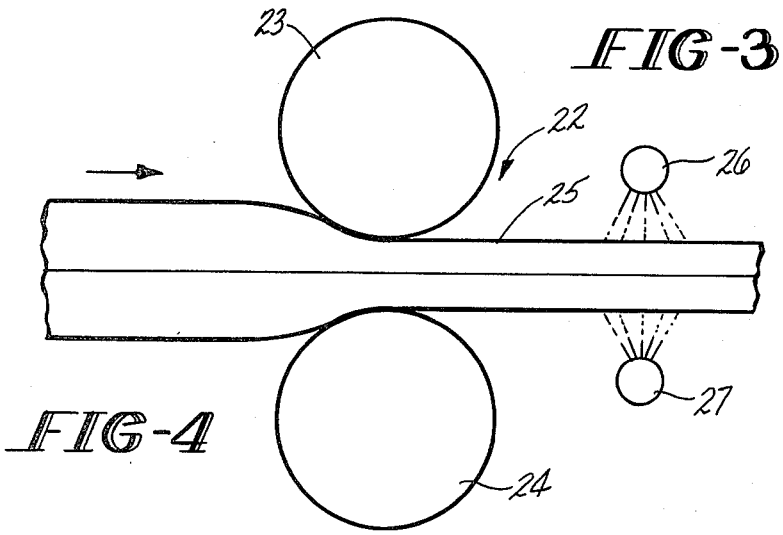
FIG. 4 is a schematic representation of an apparatus for bonding the sheets of FIG. 5 in accordance with this invention.

After rolling as in FIG. 4 the composite panel 25 generally has uneven edges due to the rolling process. Before inflation the panel edges are sheared to form a panel 25 as shown in FIG. 5. Unlike the process described in the Pauls' patents it is not necessary in accordance with this invention for the panel edge 29 where the inflation opening 31 is to be formed to be sheared at an angle. Therefore, the planes of the edges 29 of the panel 25 are generally sheared normal to the planes of the faces of the panel 25. The elimination of the bias sheared edge makes the panel 25 more safe to handle during further processing.

Referring again to FIGS. 8 and 9 a chisel 32 is positioned with its point 37 in the crack 30 in the edge 29 of the panel 25 formed by the hammering. The chisel 32 is then itself hammered in a conventional manner with a number of short blows inwardly of the panel 25 to form the inflation opening 31. In order to avoid undue separation of the sheets 20 and 20' of the panel 25 it is clamped between two sets of longitudinally extending plates 38 and 39 with one set extending parallel to the other and being arranged on either side of the inflation opening 31. The plates 38 and 39 are held in place by a suitable clamp (not shown) such as a vise grip pliers.

Figure 10:
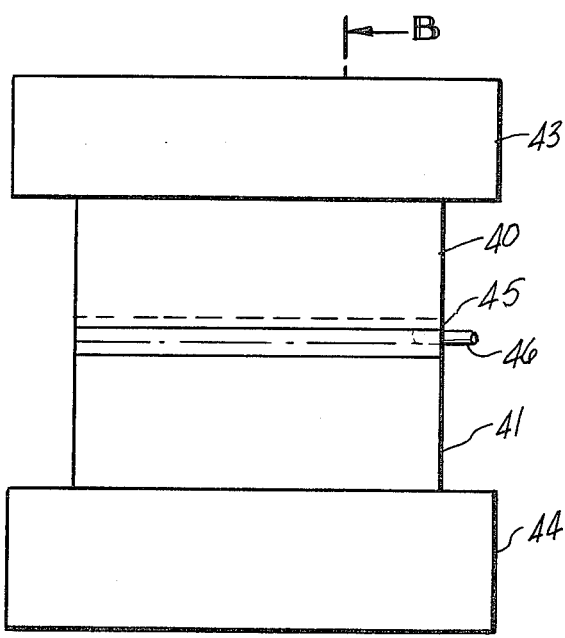
FIG. 10 is a schematic representation of a die inflation apparatus in accordance with this invention.
Figure 11:
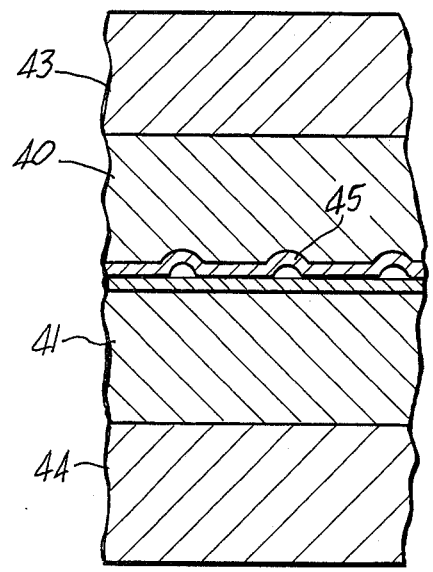
FIG. 11 is a partial cross-sectional view of the die inflation apparatus of FIG. 10 along the line B—B.

At this point, the panel 25 manufactured by the process described above is placed between die plates 40 and 41 as in FIGS. 10 and 11. The die plates 40 and 41 are clamped by conventional means such as press 43 and 44 to tightly seal the composite between them. At least one of the die plates includes a cavity 45 defining the desired pattern of tubular passageways 11 in the heat exchange panel 10. In the embodiment shown in FIGS. 10 and 11 only one of the die plates 40 and 41 includes such a cavity 45 so that the tubular passageways 11 which result will have one side flat. While only one die 40 has a cavity in the embodiments shown, if desired the opposing die 41 can have a cavity in correspondence with the cavity of the die 40 to provide tubular passageways 11 expanded out from both sides of the panel 25.

The tubular passageways are formed in the composite panel 25 by the application of fluid pressure. This is accomplished by inserting an inflation needle 46 into the inflation opening 31 at the edge 29 of the panel 25 in communiation with the desired tubular passageway pattern. Air or other suitable fluid is then forced into the composite panel to break the "green" bond between the sheets 20 and 20' in the region of the die cavity 45 where the sheets are not clamped together. Continued pressure deforms the sheets into conformity with the die cavity 45 thereby forming the desired passageway pattern in the composite panel 25. Suitable inflation pressures comprise from about 1000 to about 4000 psi. Inflation can be carried out pneumatically or hydraulically, however, pneumatic inflation is preferred.

"Green" bond as the term is used herein refers to a bond of moderate strength which will not break in ordinary handling but which will break at inflation pressures within the abovenoted range of from about 1000 to about 4000 psi. Bond enhancement as the term is used herein refers to an increase in bond strength after completion of the bonding operation, e.g., cold rolling. Bond enhancement is a kinetic process dependent on temperature and time at temperature, with the temperature being far more significant than the time.

Bond line as the term is used herein refers to the bond interface between the sheets of the composite panel. The bond line need not extend in a linear fashion.

The process and apparatus of this invention are applicable to a wide range of metals and alloys including copper and copper alloys, aluminum and aluminum alloys as noted above as well as iron and iron alloys and the alloys of other engineering metals. Particularly preferred metals and alloys include high copper alloys for good conductivity and cupro-nickel alloys for corrosion resistance.

The patents and patent applications which are set forth in this application are intended to be incorporated by reference herein.

It is apparent that there has been provided in accordance with this invention a process and apparatus for making heat exchanger panels therefrom which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A process for forming an opening in a composite metal panel comprising at least two sheets of metal having a bond therebetween which can be broken by inflation, said opening extending between said sheets and inwardly of said panel from an edge thereof, said composite metal panel being free of stop weld material sandwiched between said sheets and being adapted for forming a heat exchanger therefrom having a desired pattern of inflated tubular passageways therein, said process comprising:

providing a hammering member having a blunt surface;

hammering with said blunt surface said edge of said panel at a position wherein said opening is to be formed for delineating a bond interface between said sheets of said composite metal panel, said hammering being adapted to upset said metal at said position of said edge of said panel so that said bond interface is delineated by a crack formed between said sheets;

providing a tool having a sharp end adapted to be positioned at said crack formed between said sheets; and forming said opening at said edge of said panel by inserting said sharp end of said tool into said crack.

2. A process as in claim 1 wherein said hammering step comprises peening said edge at said position.

3. A process as in claim 1 wherein said opening comprises an inflation opening and wherein said process further includes the step of applying a fluid under pressure to said panel through said opening to form said desired pattern of inflated tubular passageways.

4. A process as in claim 1 wherein said step of providing said hammering member comprises providing a hammering member having a curved blunt surface.

* * * * *